United States Patent [19]

Jones et al.

[11] Patent Number: 5,689,304

[45] Date of Patent: Nov. 18, 1997

[54] INDOOR/OUTDOOR SURVEILLANCE HOUSING

[75] Inventors: Theodore Leroy Jones, Akron; Kathleen Elaine Arnold, York, both of Pa.

[73] Assignee: Philips Electronic North America Corporation, New York, N.Y.

[21] Appl. No.: 610,320

[22] Filed: Mar. 4, 1996

[51] Int. Cl.⁶ .................................................. H04N 5/225
[52] U.S. Cl. ............................................ 348/373; 348/143
[58] Field of Search .................................. 348/143, 151, 348/373; H04N 5/225

[56] References Cited

U.S. PATENT DOCUMENTS

| | | | |
|---|---|---|---|
| 4,320,949 | 3/1982 | Pagano | 348/143 |
| 4,945,367 | 7/1990 | Blackshear | 348/143 |
| 5,181,120 | 1/1993 | Hickey et al. | 348/143 |
| 5,394,184 | 2/1995 | Anderson et al. | 348/151 |
| 5,418,567 | 5/1995 | Boers et al. | 348/143 |

Primary Examiner—Howard W. Britton
Assistant Examiner—Luanne P. Din
Attorney, Agent, or Firm—Michael J. Balconi-Lamica

[57] ABSTRACT

A surveillance housing assembly comprises an outer shell having a top wall portion and side wall portion, wherein the side wall portion extends in a downward direction from the top wall portion to thereby define a first cavity. An inner shell comprises a top wall portion for mounting engagement with an underside of the top wall portion of the outer shell within the first cavity. The inner shell further comprises a top wall portion and a side wall portion, wherein the side wall portion extends in a downward direction from the top wall portion to thereby define a second cavity. The side wall portion of the inner shell further comprises a sequence of wall surfaces and plateau surfaces arranged for securing components of the surveillance equipment thereto in a prescribed manner such that first components of the surveillance equipment are disposed inbetween the underside of the outer shell and an outerside of the inner shell, and second components of the surveillance equipment are disposed within the second cavity. Lastly, a window assembly is provided for mounting engagement with a bottom of the side wall portion of the inner shell.

14 Claims, 10 Drawing Sheets

INDOOR/OUTDOOR SURVEILLANCE HOUSING

BACKGROUND OF THE INVENTION

1. Field of the Invention

This invention generally relates to surveillance equipment and systems, and more particularly, to an improved indoor/outdoor surveillance housing assembly for housing surveillance equipment components.

2. Discussion of the Related Art

Closed-circuit video surveillance equipment is very useful and well established. For instance, video cameras can be installed throughout a facility, such as perimeter and public areas of places of business, parking lots, hospitals, government buildings, etc. A central command center is provided for selecting, displaying, and recording of an output of any given video camera of the installed cameras. Thus, a small number of security personnel stationed at the central command center can efficiently monitor an entire facility by selecting, displaying, and recording the output of any given camera.

Video surveillance equipment can include fixed-position cameras and zoom lenses. Fixed-position cameras are useful for wide-angle shots or limited view applications such as entrances and exits. Zoom lenses are used to increase a quality of captured video by allowing security personnel to "zoom in" on a small portion of a scene in order to evaluate and/or distinguish elements of the scene in greater detail. For targets that move within a scene, the zooming function is of limited usefulness, unless the observation direction of the camera can likewise move. Therefore, cameras having zoom lenses are generally mounted on pan and tilt mechanisms. Such pan and tilt mechanisms are typically controlled via the control command center by the security personnel.

In outdoor locations, an enclosure is employed to protect the camera from precipitation, extremes in temperature, and unauthorized tampering. The optical quality of the "window" through which the camera views its prescribed viewing area must be very good. For fixed-position cameras, this window is often flat and positioned at one end of a long housing containing a camera power supply, camera body, and lens. Advantages of this type of housing include the ability to use window materials that are manufactured in sheet form, and to completely seal the enclosure cost-effectively, usually with O-rings in a cylindrical "pipe" configuration. Cooling the interior of a sealed unit must be accomplished by conduction only, and is therefore more difficult to cool than an "open" system that utilizes forced convection to circulate outside air into the enclosure.

The above-mentioned outdoor enclosure is a relatively simple type of outdoor enclosure and may be adapted for use as a moveable camera if the entire enclosure is mounted on an outdoor pan and tilt (hereinafter pan & tilt) mechanism. The disadvantages of such an approach include a larger size pan & tilt mechanism needed to bear the additional loads of the enclosure, wind forces, and ice accumulation. Further disadvantages include slower pan and tilt speeds due to the additional mass, and a lack of "discreteness", that is, lack of an ability to hide the viewing direction of the camera from external observers. Also, the purchase of separate enclosure and pan & tilt units usually necessitates the purchase of a separate power supply and/or controller unit for each pan & tilt unit, which must also be installed at the camera site.

A more integrated approach overcomes these disadvantages by integrating the camera power supply, camera body, lens, pan & tilt mechanism, and pan & tilt controller all in the same enclosure. A hemispherical "window" is provided through which the camera can view its surroundings as it pans and tilts inside the enclosure. An example of such an integrated approach is disclosed in U.S. Pat. No. 4,984,089, entitled "Outdoor Surveillance Dome with Enhanced Environmental Aptitude and Control System Therefor" and issued Jan. 8, 1991 to Stiepel et al. In the later integrated approach, the hemispherical window is often tinted or coated with a "mirror" finish to provide discreteness, preventing an outside viewer from being able to discern what direction the camera is pointing at any given moment. Unfortunately, the materials and methods available to form a hemispherical window with good optical quality are more limited than those available for producing a flat window.

Materials such as cell-cast acrylic plastic can be free-formed to achieve a hemispherical shape with good optical quality at fairly thin wall thicknesses. However, cell-cast acrylic plastic material is relatively brittle and must feature a sizable flange that can be trimmed and machined for assembly fasteners. In addition, cell-cast acrylic plastic is only available in a low UL94-HB flammability rating. As a result, a window made out of cell-cast acrylic cannot be considered part of the enclosure from a safety standpoint. Separate, higher-flammability safety barriers must be provided inside the enclosure for components and other items, such as, line-voltage power supply transformers and wiring. Still further, the window plastic can suffer from long-term optical degradation due to an exposure to ultraviolet light.

In a typical outdoor camera enclosure, a single main housing part is utilized, wherein a top thereof is connected to a pipe. Electrical connections are generally routed from a main power source through the pipe and into the housing. In addition, the hemispherical window and additional internal components, such as the camera power supply, camera body, lens, pan & tilt mechanism, and controller electronics, are removably attached to an inside of the single housing part.

In U.S. Pat. No. 4,984,089, a sunshield is added to the surveillance housing. A gap between the housing and the sunshield serves as a "passage" that provides an air flow path between the exterior ambient and the interior of the housing via intake and exhaust valves. The extra hardware involving intake and exhaust valves is intended to enhance an environmental control of the housing by isolating the camera from the exterior ambient in a heating mode and for communicating with the exterior ambient in a cooling mode. Such extra hardware unfortunately adds cost and complexity to the housing. In addition, the housing of U.S. Pat. No. 4,984,089 further includes the use of a filter on an intake opening. Such a filter adds further cost and complexity to the housing. Still further, the filter is subject to clogging and degradation, thereby requiring a routine maintenance.

Housings which are made from spun sheet metal provide protection against electromagnetic interference (EMI). A sheet metal housing further conducts heat readily and therefore provides little thermal insulation. Other enclosures may use a thermoformed plastic for a better thermal insulation and impact resistance, however, these enclosures provide no protection against EMI. Economical use of either process prohibits a use of reentrant contours, that is, shapes that are narrower at the open end than at the closed end. In an effort to work around this prohibition of reentrant contours, housings are made which incorporate two undesirable features. The first feature is the use of brackets for supporting internal components that are attached to an inside of the housing, further requiring holes for fasteners that penetrate the housing wall. These holes compromise the long-term water-tight integrity of the housing against an ingress of water in outdoor applications, especially when a differential thermal expansion of plastic and metal parts is present. Exposed fasteners are also subject to corrosion. The second undesirable feature applies to designs where the window diameter is approximately the same as the housing diameter for styling purposes. A sizable double step is formed in the lower edge of the housing to provide a horizontal mounting surface for the flange of the hemispherical window. This two-step equatorial bulge disrupts the aesthetics of an otherwise smooth outside surface appearance, and further provides a ledge on which dirt and/or other debris can undesirably accumulate.

Where some attachment points are moved up to a top inner surface of the housing to minimize the number of penetrations through the housing wall, the bracket and other structure supporting the internal components become larger and more complex. As a result, the camera mounted within the housing is more susceptible to vibration with respect to the housing when disturbed by wind gusts, thereby resulting in an undesirable unsteady view of the scene. Furthermore, acoustical noise can be generated by the pan & tilt mechanism which is often amplified by the housing. Such acoustical noise draws unwanted attention to the camera and thereby warns those being observed of camera movement. Still further, housings for different mounting applications (such as pendant versus hard ceiling) typically require completely independent assembly of internal components for each type of mounting application. In such instances, there is little or no modularity, thus reducing factory process flexibility and increasing a cost of inventory and work in process.

Aesthetic-related issues are also a concern with presently known designs, especially in pendant-type installations. Spun housings, which involve low tooling costs, nevertheless suffer several disadvantages, including "ripples" created from a progressive spin-forming process that mar the housings' appearance, and a design limitation of circularly symmetric profiles. If a process such as metal hydroforming is used for the making of housings, non-circular shapes can be achieved for design flexibility, along with a very smooth housing finish. However, expensive cam dies and assembly fixturing are required to punch fastener holes in this high-quality formed surface and to achieve the same without any local deformation. Finally, rivets or other fasteners are used to support internal components and the same can be seen on the outside of a housing, resulting in a somewhat aesthetically displeasing outside appearance.

Housings which are characterized as being "open", utilize forced convection to circulate an outside air into the housing enclosure for a better thermal performance. For instance, in the summer, a blower in the top of the housing pumps out hot air rising inside the enclosure, replacing it with cooler ambient air introduced at the lowest possible point in the housing. In the prevalent downward viewing orientation of a hemispherical window, an inlet for circulating air cannot be lower than an upper edge of a hemispherical "bowl" of the window without compromising window optics. As a result, housing designs that do not include a filter will typically introduce air near a top edge of the window, which allows dust, moisture, and other foreign material to enter and settle directly into the window hemisphere, thereby degrading the window's optical qualities over time. In the winter time, a downward viewing orientation of the hemispherical window also makes it difficult to keep the window warm in the winter. In U.S. Pat. No. 4,984,089, a fan and heater are mounted on a rotating camera stage. Mechanical constraints, however, reduce an effectiveness of this later approach in many configurations, and an additional cost to the housing is added for providing additional electrical "slip ring" connections which would be required through the rotating pan joint of the corresponding pan & tilt mechanism.

Alternatively, fixed-resistance heaters are typically mounted further up out of view on a stationary surface. When actuated by a fixed-temperature thermostat, most of the heat from the fixed-resistance heaters rises up away from the window by natural convection, with a significant portion leaking out the exhaust blower opening in the top of the enclosure. Meanwhile, cold air leaking in the air inlet points near the top edge of the window is free to settle directly into the hemisphere. While U.S. Pat. No. 4,984,089 describes the addition of air valves for controlling such leakage, such valves add cost, necessitate larger fans for the same air flow, and reduce the long-term reliability of the system.

One brute-force solution to the above housing design is to substantially oversize the heaters used in the housings. However, for instances of remote locations or installations with a significant number of cameras, the additional power supply requirements are costly and undesirable. Yet another approach is to add a reversible exhaust blower to push heat down from above during the winter. The effect on the "bowl" region of the window is questionable due to interposed mechanisms, and furthermore some added control components are required. As a result, such housing enclosures allow the camera and window to stay cold, risking damage to the camera/lens and inviting external ice formation on the window.

Some known housing enclosures also fail to prevent condensation on an inside surface of the hemispherical window during periods of transition from warmer, humid air to colder, dryer air. It is possible that having the heaters energized during this transition would prevent the warm moist air from condensing inside the housing. However, in the case of fixed-temperature thermostats, the thermostats fail to energize the fixed-resistance heaters until a fairly large temperature drop has occurred, and furthermore some time lag for a heat transfer adds to the delay. Meanwhile, the warm, moist air inside the enclosure is condensing on any surfaces being cooled by the colder outside air. Even after the heaters energize, there is no means to get rid of the condensed moisture. This is typically the case, since the blower is usually energized by a separate fixed-temperature thermostat only upon an increase in temperature, whereas in the instance most likely to create condensation, the temperature is falling. A use of fixed-temperature thermostats for fixed-resistance heaters and exhaust blower power control also requires that the thermostat be qualified by safety agencies at various line voltages. Furthermore, wires connecting to these components must be routed and/or protected to meet strict safety standards.

Another problem with known enclosure housings which also allow access for servicing without disabling of the pan & tilt mechanism is that it presents a dangerous situation for service personnel. For instance, an unexpected mechanism movement could pinch the hands of a service technician or cause an accident, especially where the camera is installed high above the ground or floor level. Sometimes a disabling switch is provided, but it is not automatically actuated upon removal of the window, and is typically mounted using fasteners that penetrate the housing wall, resulting in potential leakage problems, as mentioned earlier. In instances where an interlock is provided, it would require a separate shield to prevent installers and/or others from easily tampering with its connections to defeat the interlock.

SUMMARY OF THE INVENTION

An object of the present invention is to overcome the problems in the art discussed above.

According to the present invention, a surveillance housing assembly for use in housing surveillance equipment comprises an outer shell, an inner shell, and a window assembly. The outer shell comprises a top wall portion and side wall portion, wherein the side wall portion extends in a downward direction from the top wall portion thereby defining a first cavity. The inner shell comprises a top wall portion for mounting engagement with an underside of the top wall portion of the outer shell within the first cavity. The inner shell further comprises a side wall portion, wherein the side wall portion extends in a downward direction from the top wall portion thereby defining a second cavity. The side wall portion of said inner shell further comprises a sequence of wall surfaces and plateau surfaces arranged for securing components of the surveillance equipment thereto in a prescribed manner such that first components of the surveillance equipment are disposed inbetween the underside of the outer shell and an outerside of the inner shell, and second components of the surveillance equipment are disposed within the second cavity. Lastly, a window assembly is provided for mounting engagement with a bottom of the side wall portion of the inner shell.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings in which like reference numerals are carried forward, and in which.

DETAILED DESCRIPTION OF THE PREFERRED EMBODIMENTS

Figure 1:
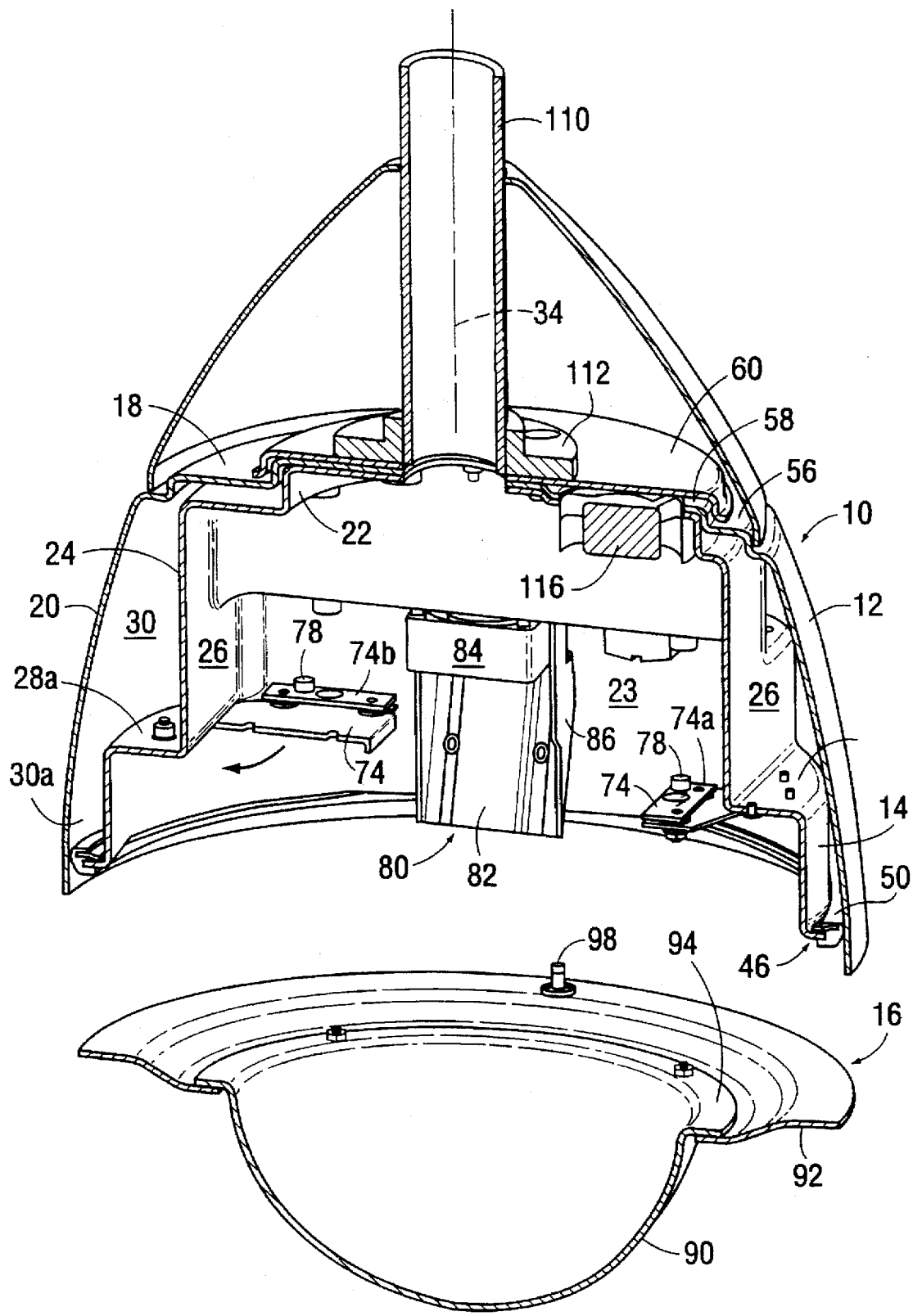
FIG. 1 shows perspective view of a vertical cross-section of the surveillance housing assembly according to one embodiment of the present invention.

Referring now to FIG. 1, there is shown a surveillance housing assembly 10 for use in housing various components (as shown by reference numerals 75 and 76 in FIGS. 5 and 6) of surveillance equipment. The surveillance housing 10 comprises an outer shell 12, an inner shell 14, and a window assembly 16. The outer shell 12 comprises a top wall portion 18 and side wall portion 20. The side wall portion 20 extends in a downward direction from the top wall portion 18 thereby defining a first cavity on an inside of the outer shell 12.

The inner shell 14 comprises a top wall portion 22 for mounting engagement with an underside of the top wall portion 18 of the outer shell 12 within the first cavity. The inner shell 14 further comprises a side wall portion 24, the side wall portion 24 extending in a downward direction from the top wall portion 22 to thereby define a second cavity 23 on an inside of the inner shell 14. The side wall portion 24 of the inner shell 14 further comprises a sequence of wall surfaces 26 and plateau surfaces 28 arranged for a securing of various components 75 and 76, for example, of the surveillance equipment thereto in a prescribed manner. The prescribed manner corresponds to a strategic positioning and securing of the various components such that first components (such as, component 75) of the surveillance equipment are disposed inbetween the underside of the outer shell 12 and an outside of the inner shell 14, i.e., within a limited access cavity 30. In addition, second components (such as, component 76) of the surveillance equipment are disposed within the second cavity 23. As a result, the first components of the surveillance equipment can be advantageously rendered directly inaccessible upon the securing of the inner shell 14 within the outer shell 12, while the second components of the surveillance equipment can be rendered accessible from below. The specific sequence of wall surfaces 26 and plateau surfaces 28 of the inner shell 14 is dependent in part upon the particular requirements of the specific surveillance equipment to be housed in the surveillance housing assembly 10. In addition, the sequence of wall surfaces 26 and plateau surfaces 28 preferably conform in part to the particular shapes of the various components to be mounted thereon, thereby forming a contoured side wall portion 24 of the inner shell 14. The window assembly 16 is configured for mounting engagement with a bottom of the side wall portion of the inner shell 14. Window assembly 16 is removably attached to inner shell 14 via suitable fasteners, further as will be discussed herein below.

Figure 2:
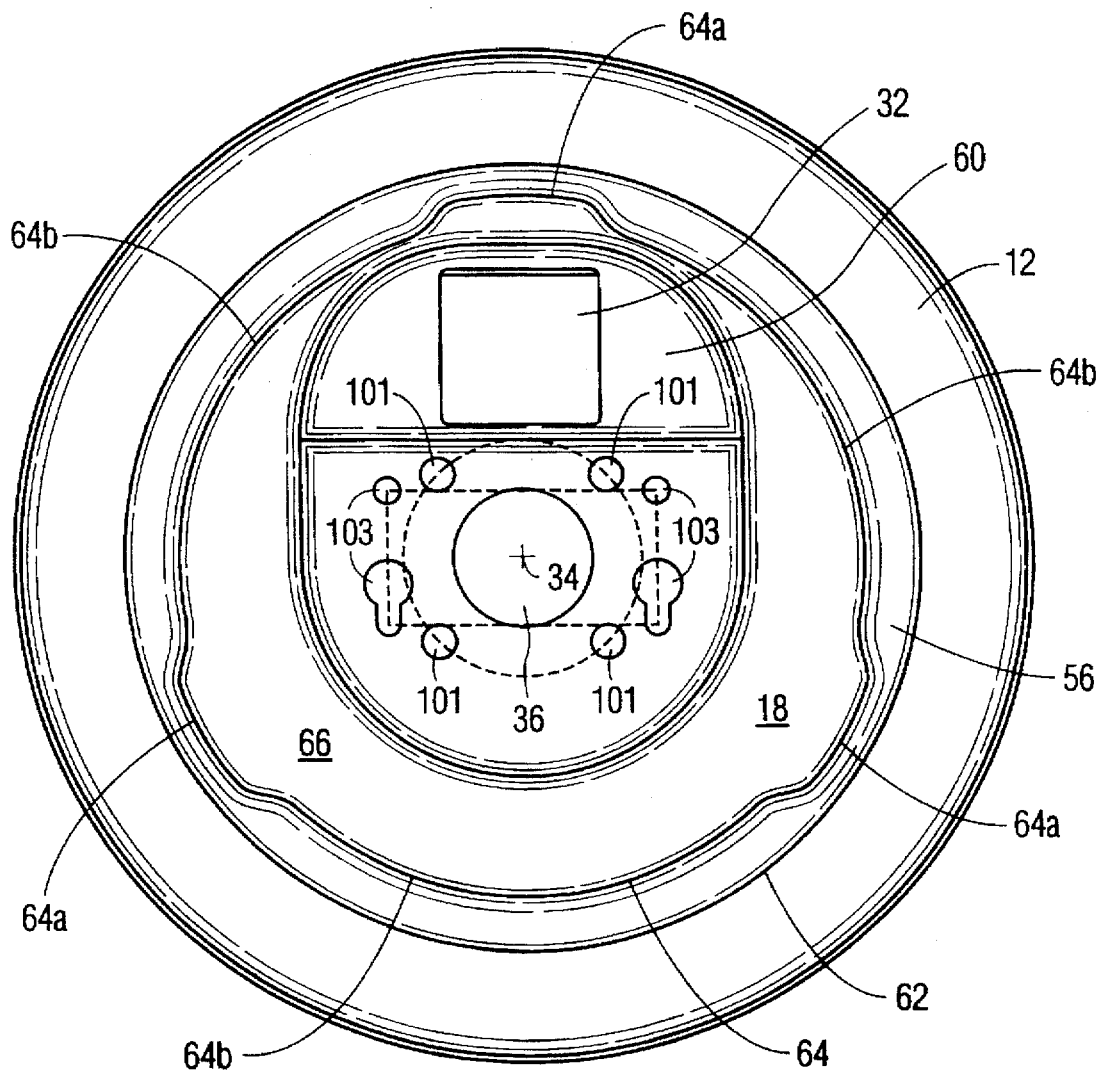
FIG. 2 shows a top view of the outer shell of the surveillance housing assembly shown in FIG. 1.

Referring now to FIGS. 1 and 2, the top wall portion 18 of the outer shell 12 further comprises an air exhaust aperture 32 located therein. The air exhaust aperture 32 is positioned off center from a central axis 34 of outer shell 12. A generally circular aperture 36 centered on the central axis 34 is provided in the top wall portion 18 of the outer shell 12 for the purpose of enabling electrical cabling to pass therethrough and into the housing 10. The top wall portion 22 of the inner shell 14 also comprises an air exhaust aperture located therein. The air exhaust aperture of the inner shell 14 is preferably designed to be coincident with the air exhaust aperture 32 of the top wall portion 18 of the outer shell 12. Still further, the top wall portion 22 of the inner shell 14 also comprises a generally circular aperture which is preferably coincident with aperture 36 in the top wall portion 18 of the outer shell 12.

Figure 5:
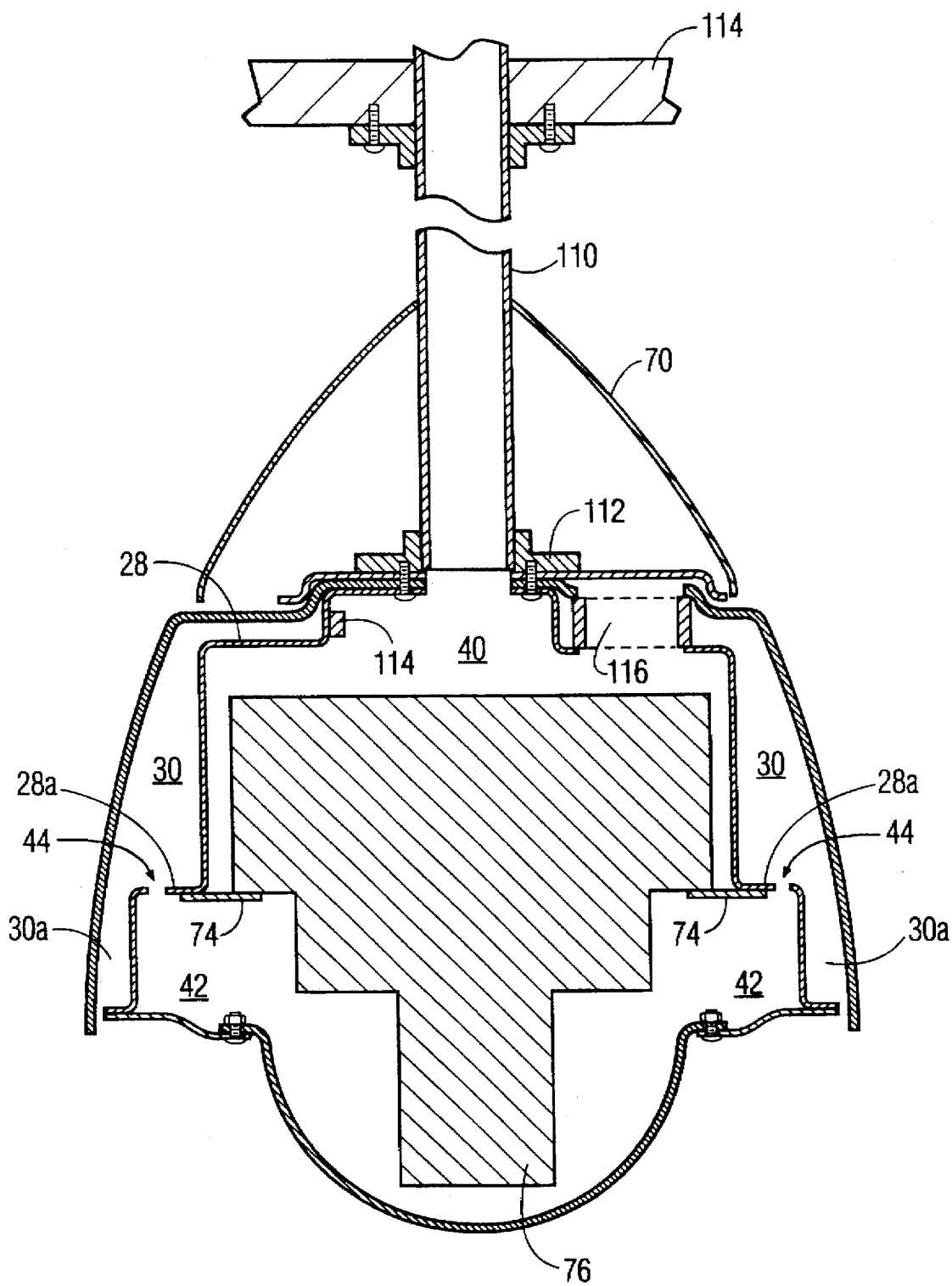
FIG. 5 shows a vertical cross-sectional view of a first embodiment of the surveillance housing of the present invention.
Figure 6:
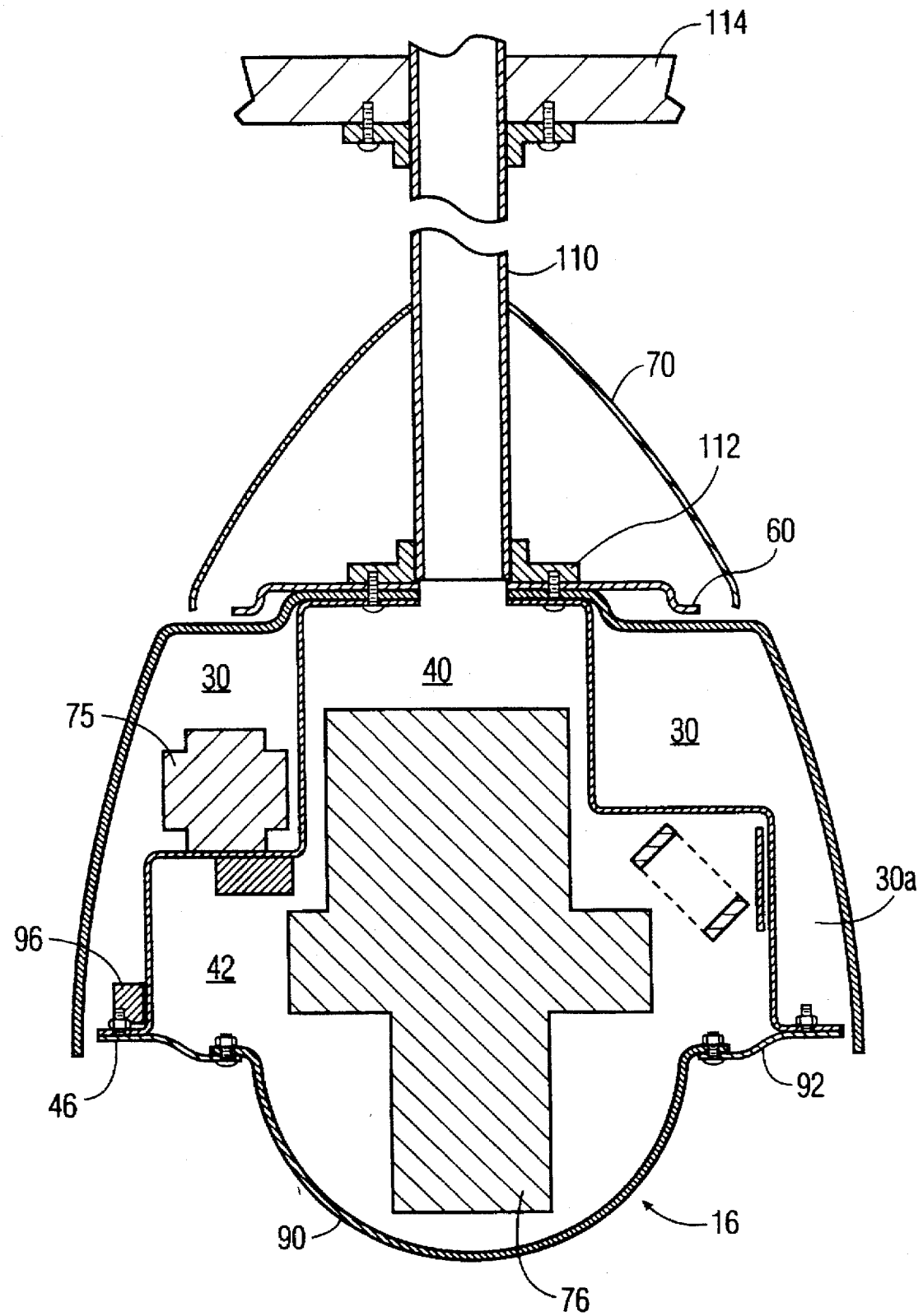
FIG. 6 shows a vertical cross-sectional view of the first embodiment of the surveillance housing of the present invention at ninety degrees (90°) from the view shown in FIG. 5.

Referring now to FIGS. 1, 5 and 6, the inner shell 14 further comprises an upper compartment 40 and a lower compartment 42 within the second cavity 23. A set of plateau surfaces 28a on the side wall portion 24 of the inner shell 14 separate the upper compartment 40 from the lower compartment 42. Side wall portion 24 further comprises at least one air inlet aperture 44 (FIG. 5) for establishing an air flow path traversing into the first compartment 42, through the second compartment 44, and exiting via the air exhaust aperture of the top wall portion 22 of the inner shell 14. Inner shell 14 still further comprises a flange 46 attached to and/or integral with the bottom of the side wall portion 24, thereby being proximate to the bottom of the side wall portion 20 of the outer shell 12. Flange 46 preferrably extends in an outward radial direction from the central axis 34 to be proximate to but not in contact with the inside of the side wall portion 20 of outer shell 12 further by a first dimension. The window assembly 16 attaches to the flange 46 via suitable fasteners.

Figure 3A:
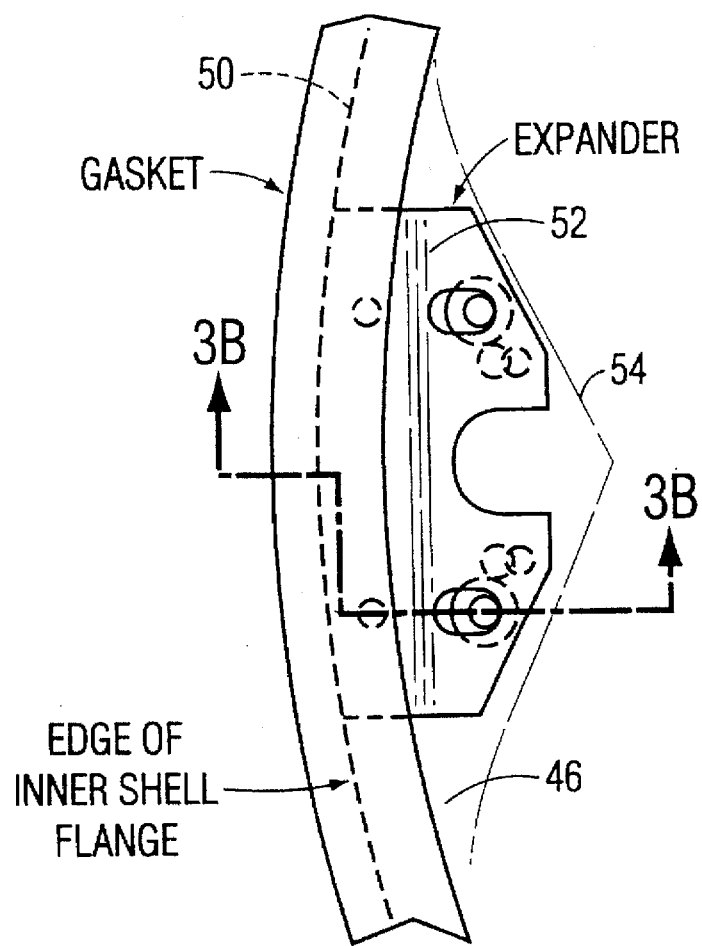
FIGS. 3A and 3B show a top view and side cross-sectional view, respectively, of an expander means and gasket in a first position on the flange of the inner shell in accordance with the present invention.
Figure 3B:
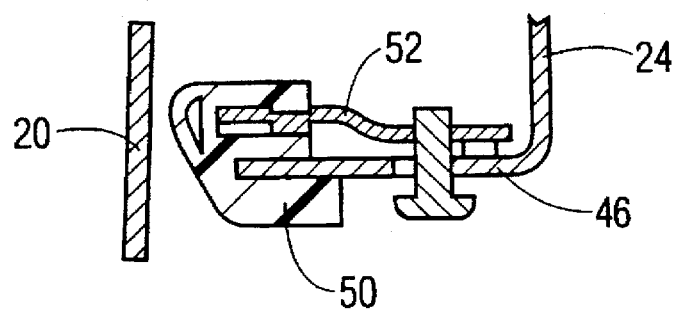
Figure 4A:
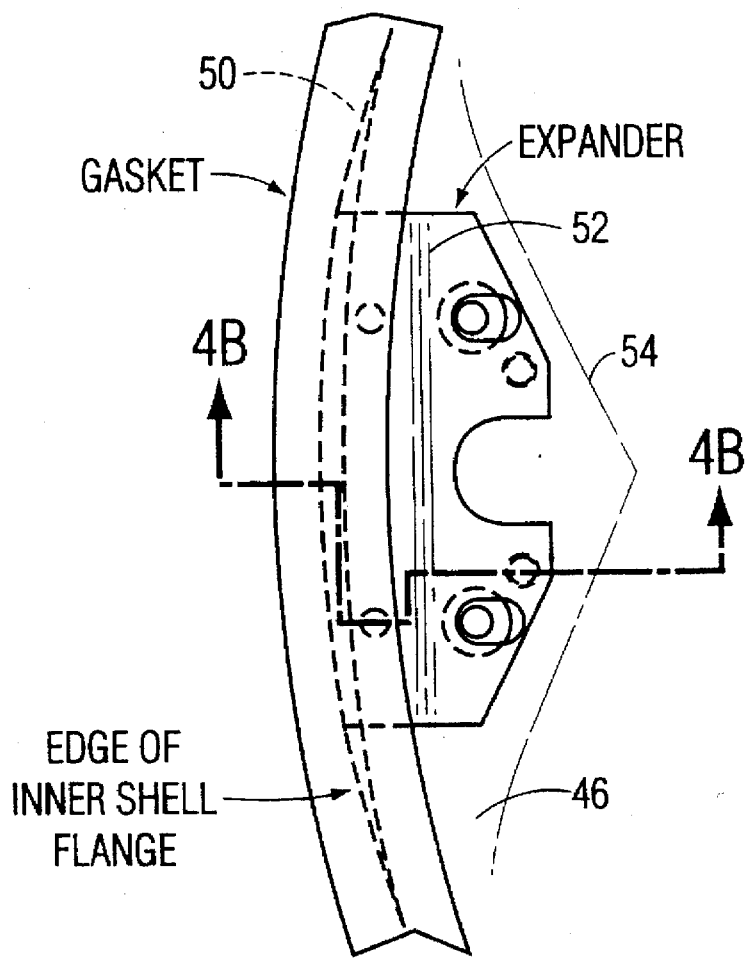
FIGS. 4A and 4B show a top view and side cross-sectional view, respectively, of an expander means and gasket in a second position on the flange of the inner shell in accordance with the present invention.

Turning now to FIGS. 1, 3A, 3B, 4A and 4B, a gasket 50 is disposed around a perimeter of the flange 46. Gasket 50 preferrably comprises a strip of suitable gasket material, further preferrably characterized by an extruded "E" shape having a hollow portion in the vertical section of the "E" shape. The hollow portion provides an enhanced stabilization, as will be discussed herein below. The gasket fits over flange 46 via one of the open sections of the "E" shape, as shown in FIGS. 3A and 4A, for example. In addition, the gasket 50 extends in a radial direction to be proximate to but not in contact with the inside of the side wall portion 20 of outer shell 12. That is, gasket 50 extends in a radial direction to be proximate to the inside of the side wall portion 20 by a second dimension, wherein the second dimension is less than the first dimension with respect to the flange 46 as discussed herein above.

Figure 4B:
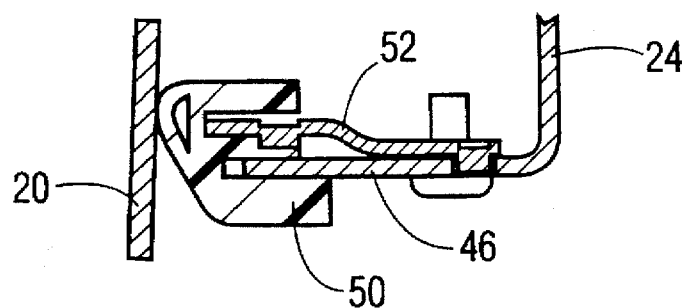

Suitable expander means 52 are provided for extending and/or expanding gasket 50 in an outward radial direction for making gasket 50 contact the inside of the side wall portion 20 of outer shell 12. Expander means 52 are provided at a number of points around the perimeter of flange 46 for stabilizing a bottom portion of the inner shell 14 within the outer shell 12. Expander 52 comprises a shaped plate having an outer radius at one side edge for contacting with gasket 50 and a contoured shape at an opposite side edge. The contoured shape can comprise an angled shape as shown in FIGS. 3A and 4A. Preferrably, at a bottom side edge of side wall portion 24, a locator contour 54 is provided for assisting in an initial locating of expander 52 onto flange 46. The locator contour 54 and the contoured shape on the expander 52 are preferably matched. Furthermore, at least three expanders 52 are preferrably provided around the perimeter of flange 46, i.e., at least three equally spaced expanders 52. Once expanded in an outermost radial position, each expander 52 is secured in the expanded position with appropriate securing means such as screws or other suitable fasteners. With an expander 52 in its outermost position, gasket 50 is forced into contact with the inside of the side wall portion 20 of the outer shell 12 as shown in FIG. 4B. Thus, a vibrational stablization of the inner shell within the outer shell can be effectively carried out and maintained. In addition, as indicated herein above, the window assembly 16 is configured for mounting engagement with a bottom of the side wall portion of the inner shell 14, and more particularly, with gasket 50. Window assembly 16 is removably attached via suitable fasteners to flange 46 of inner shell 14, wherein gasket 50 forms a weather tight seal between inner shell 14 and window assembly 16.

Referring now to FIGS. 1 and 2, the top wall portion 18 of the outer shell 12 comprises a plurality of plateau surfaces, for example plateau surfaces 56 and 58. One of the plurality of plateau surfaces 58 contains the air exhaust aperture 32 of the top wall portion 18 of the outer shell 12. The surveillance housing 10 further comprises an air outlet cover means 60 for protectively sheltering the exhaust aperture 32 and further for enabling a torturous air flow path proximate the air exhaust aperture 32 of the top wall portion 18 of the outer shell 12. The air outlet cover means 60 is further for mounting engagement on a plateau surface above the plateau surface 58 containing the air exhaust aperture 32 of the top wall portion 18 of the outer shell 12. Cover means 60 further preferrably contains a generally circular aperture which is coincident with aperture 36 in the top wall portion 18 of the outer shell 12.

Referring still to FIGS. 1 and 2, plateau surface 56 of the top wall portion 18 of outer shell 12 comprises a radially outermost plateau surface having an outer perimeter 62 and an inner perimeter 64. The inner perimeter 64 comprises first sections 64a having a first radial dimension and second sections 64b having a second radial dimension. The first radial dimension is greater than the second radial dimension. An additional plateau surface 66 is positioned above the radially outermost plateau surface 56 thereby forming a step of a given height. The step thus formed in conjunction with the first and second sections 64a and 64b advantageously provide a unique profile for enabling a desired positioning of a decorative cap 70 and further for establishing a desired air flow path, as will be discussed further herein below.

Figure 7:
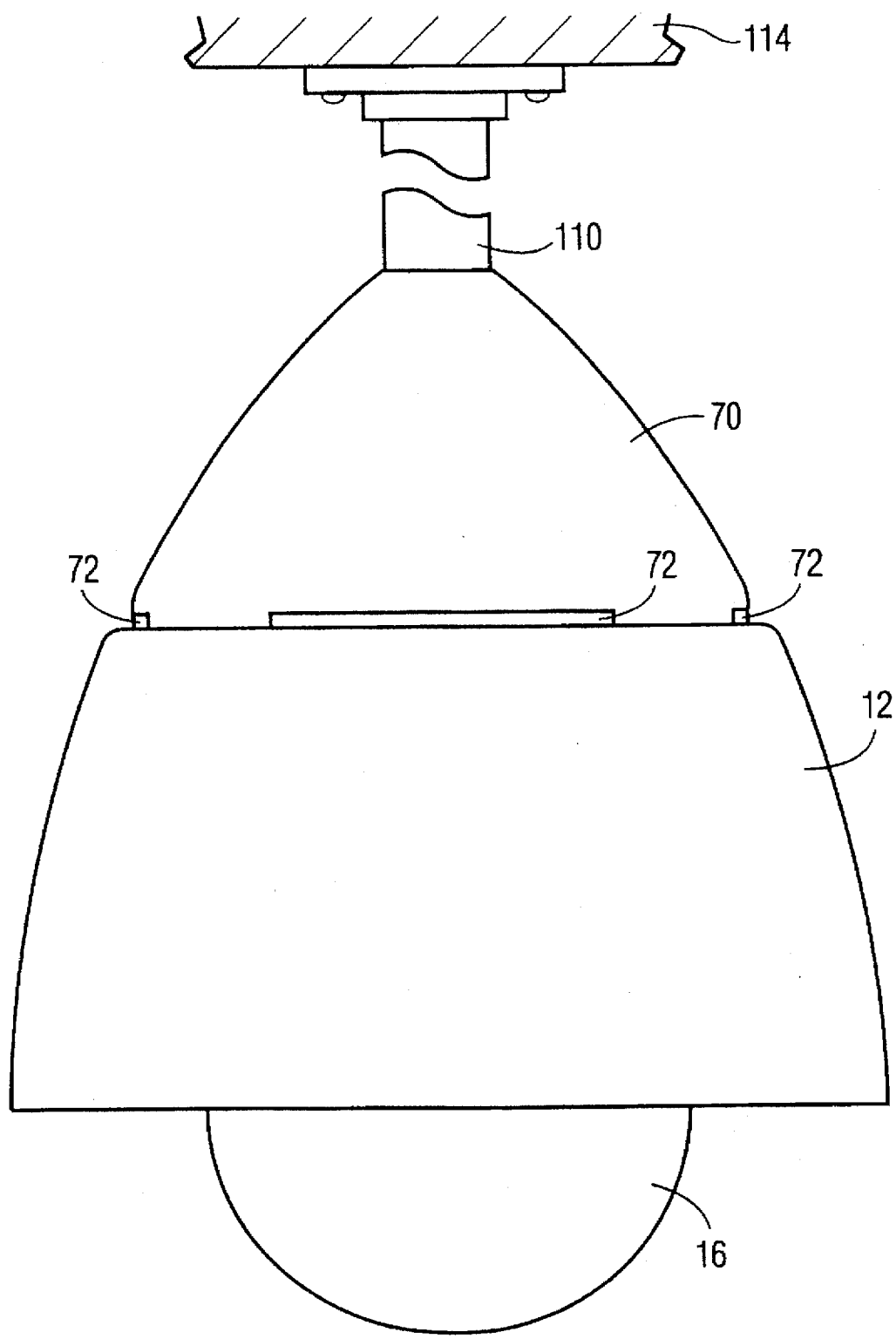
FIG. 7 shows an exterior view of the first embodiment of the surveillance housing of the present invention.

The surveillance housing further comprises decorative cap 70 for mounting on top of the top wall portion 18 of the outer shell 12. The decorative cap is preferrably comprises a material shaped in a hollow inverted cone, i.e., having a conical shape. Cap 70 comprises a bottom edge portion thereof having a plurality of notches 72 therein (FIG. 7). Notches 72 are preferrably equally spaced about the bottom of cap 70 and have a height dimension which is less that the height dimension of the step between plateau surface 56 and plateau surface 66. Notches 72, in combination with the sections 64b, provide a path for an exhaust air flow and further provide for protection against an ingress of unwanted matter, such as rain, snow, etc. In addition, a lowermost portion of the decorative cap 70 comprises an inner dimension for contacting with the step at the first sections 64a. Decorative cap 70 further comprises a lowermost exterior radial dimension for being in substantial alignment with the outer perimeter of the radially outermost plateau surface 56.

Referring once again to FIGS. 1 and 5, the surveillance housing assembly 10 further comprises means 74 for mounting a component 76 (or subassembly, such as a pan & tilt mechanism, camera, and lens) of the surveillance equipment to an underside of the inner shell 14. The mounting means 74 comprises a first mechanical mount 74a and a second mechanical mount 74b. The first mechanical mount 74a is fixedly attached to a first one of the set of plateau surfaces 28a on the side wall portion 24 of the inner shell 14 which separate the upper compartment 40 from the lower compartment 42. The second mechanical mount 74b is rotatably attached to the second of the set of plateau surfaces 28a, opposite to the first of the set of plateau surfaces, on the side wall portion 24 of the inner shell 14. The second mechanical mount 74b is further rotatable between an out-of-the-way position as shown in FIG. 1 and an active support position, similar in orientation to the fixed position of the mount 74a. Mounts 74 further comprise suitable vibration damping means 76, comprising for example, flexible washers. Still further, suitable locator pins 78 are positioned on a top side of mounts 74 for enabling an alignment of mounting apertures in the mounts with corresponding securing locations of the component 76 to be mounted thereon.

The surveillance housing assembly 10 still further comprises a heater and recirculating blower means 80 positioned within the second cavity 23 for substantially directing heated air within the lower compartment of the inner shell 14. Heater and blower means 80 comprises a heater 82 and recirculating blower 84. Blower 84 recirculates air across the heater 80, wherein the heated air is directed into the window assembly 16, via a suitable shaped extruded plate 86

The window assembly 16 comprises a hemispherical window 90 and a decorative trim ring 92 attached to a flange 94 on an outer perimeter of the hemispherical window 90. In addition, an interlock switch 96 is mounted (FIG. 6) proximate the top surface of the flange 46 of the inner shell 14 for disabling an electrical power to at least the components of the surveillance equipment positioned within the underside of the inner shell when the window assembly 16 is not yet attached to the inner shell 14. For enabling of electrical power when the window assembly 16 is attached to the inner shell 14, the window assembly 16 further comprises a suitable interlock post 98 attached to the trim ring 92 of the window assembly 16. The interlock post 98 provides for tactical engagement with the interlock switch 96 through a corresponding aperture (not shown) formed in the flange 46 of the inner shell 14.

In a preferred embodiment, the surveillance housing assembly 10 comprises a pendant-mount type housing, such as that shown in FIGS. 1, 5 and 6.

In an alternate embodiment, the surveillance housing assembly 210 comprises a below-the-ceiling-mount type housing, such as that shown in FIG. 8.

Figure 9:
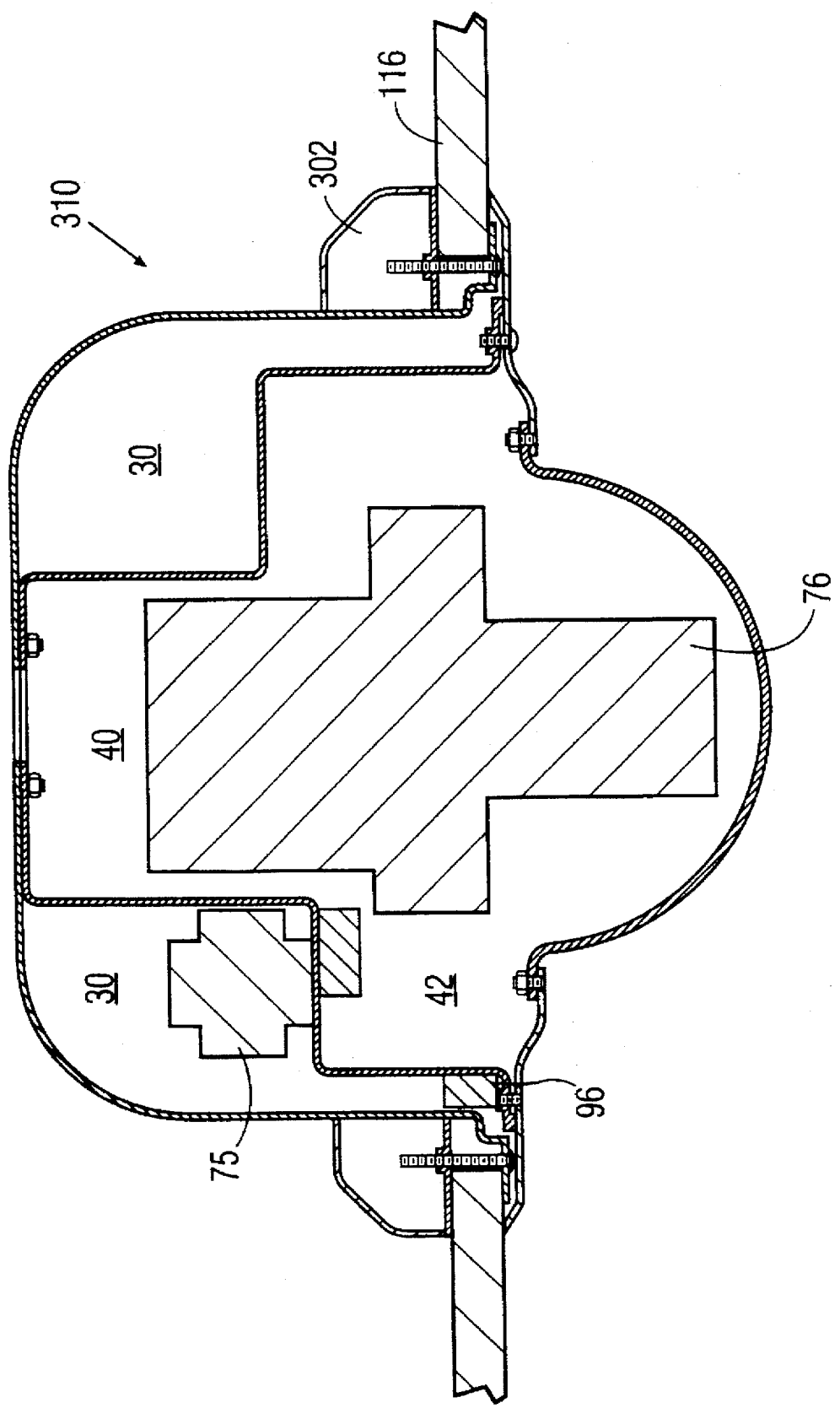
FIG. 9 shows a vertical cross-sectional view of yet another alternate embodiment of the surveillance housing of the present invention.
Figure 10:
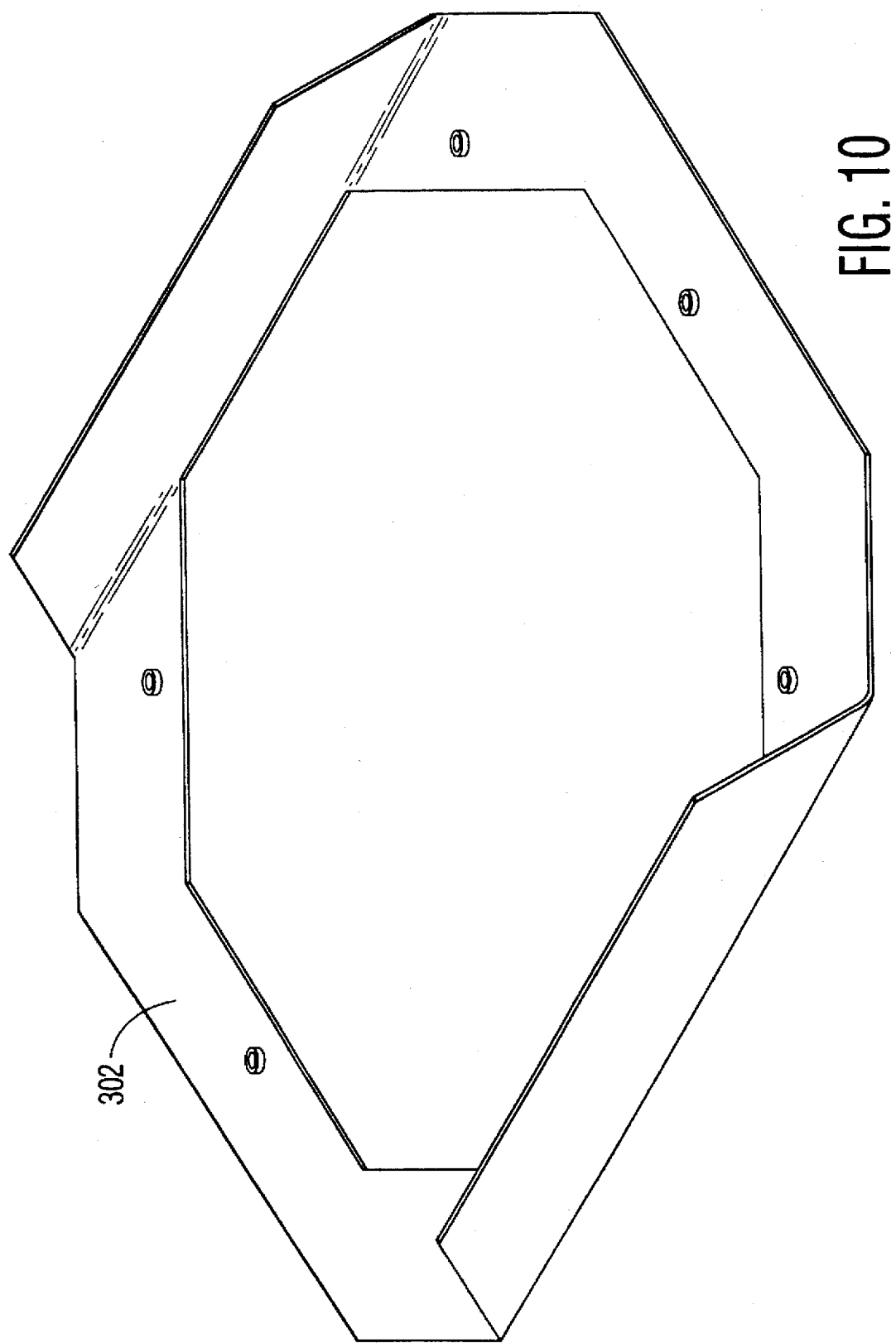
FIG. 10 shows a support bracket for use with the alternate embodiment of the surveillance housing of the present invention of FIG. 9.

In yet another alternate embodiment of the present invention, the surveillance housing assembly 300 further comprises a flush-ceiling-mount housing, such as that shown in FIG. 9. In this later embodiment, a retaining bracket 302 is provided for securing the housing to a ceiling. Furthermore, the trim ting 392 of the window assembly 316 extends in a radial direction beyond the outer perimeter of the lower most portion of the outer shell 312.

Thus in accordance with the present invention, there is provided an outdoor surveillance housing 10 comprising an outer shell 12, an inner shell 14, and a window assembly. In operation, the outer shell 12 and/or inner shell 14 can be affixed to a support pipe 110 via a pipe flange 112 and appropriate fasteners. The support pipe 110 is suitably attached to a support means 114, such as a ceiling or overhead pole. Suitable mounting apertures 101 are bored into the outer shell and inner shell as shown in FIG. 2. Other suitable attachment methods may be possible, for instance, the outer shell 12 may be attached to either the inner shell or the support pipe. Neither the outer shell 12 or the inner shell 14 require any reentrant contours. The horizontal flange 46 on the inner shell 14 is positioned to be proximate the bottom of the outer shell 12 such that when the flange/trim ring 92 of the hemispherical window assembly 16 is affixed thereto, a complete enclosure is thereby formed to contain the surveillance camera body, lens, pan & tilt mechanism, power supply, and controller.

Figure 8:
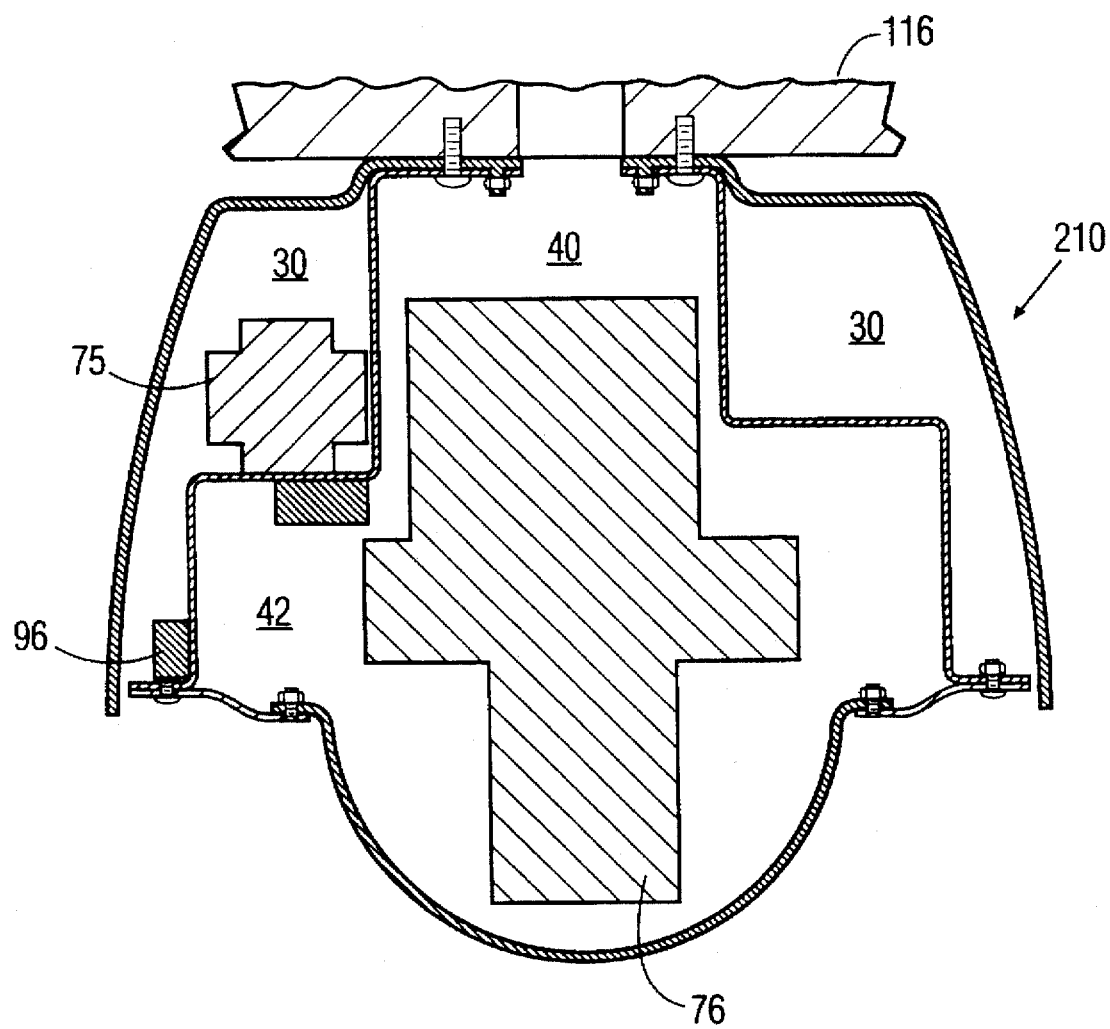
FIG. 8 shows a vertical cross-sectional view of an alternate embodiment of the surveillance housing of the present invention.

In the alternate embodiments of the invention, such as that shown in FIG. 8, suitable mounting apertures 103 are bored into the outer shell and inner shell as shown in FIG. 2. For the embodiment of FIG. 9, a suitably sized hole is bored into the ceiling 116 for insertion of the housing assembly 310, wherein the housing assembly is secured to the ceiling via mounting bracket 302 and appropriate fasteners.

The cavity 30 resulting between the walls of the inner shell 14 and the outer shell 12 is useful for addressing a number of deficiencies in known housings, as will be elaborated below. In addition, the inner shell 14 is advantageously configured to provide structural support functions so that the outer shell 12 can be optimized for a clean appearance and long-term weatherability. Inner shell 14 further provides for a degree of modularity, wherein the resulting modularity also increases production flexibility and efficiency. This is evidenced in that for the manufacture of a housing in accordance with the present invention, the particular housing type to be produced does not have to be decided upon until near the end of an assembly cycle.

The two-walled configuration of the housing of the present invention advantageously provides an improved housing over known housing, in particular, those employing a "sunshield" approach, in several ways. In the present invention, provision is made for an incoming air deceleration plenum in the region 30a as shown in FIGS. 1, 5 and 6, thus rendering the requirement of a filter unnecessary. The present invention further advantageously provides for other uses of the cavity 30 between the two walls of the outer and inner shells. That is, cavity 30 provides for the mounting of components, such as a power supply transformer, that are intended to be protected for safety reasons. Also, the inner shell 14 of the present invention explicitly provides surfaces for mounting internal components more cost-effectively by utilizing fewer parts.

A choice of different materials for the outer shell 12 and the inner shell 14 further allows for a design optimization beyond that presently known. For instance, if EMI immunity and structural goals can be achieved with a hydroformed sheet metal inner shell, the outer shell could be made of a thermoformed plastic for better impact resistance and molded-in color. Furthermore, since all internal components are fastened to corresponding mounting holes within the inner shell, the outer shell has a clean appearance and further has added superior long-term weatherability.

The present invention further is implemented to eliminate the unsightly equatorial bulge of known housings, further for improving the function and appearance of the window flange. Instead of attempting to achieve a window diameter that is the same as the housing diameter, in the embodiment of the present invention, the housing radius is always larger than the window radius by the distance of the window flange width. The inner shell 14 supports the window flange in a position slightly above the lower edge of the outer shell 12 for advantageously preventing rainwater ingress, for example. When the window flange is covered with a trim ring, the visual effect of the resulting "overhang" of the housing looks clean and provides no ledge for dirt and/or other debris to accumulate. This overhang also shields the acrylic window from direct exposure to the sun during the middle of the day, when harmful ultraviolet exposure would be most intense.

Further advantages of the double-walled construction of the present invention are realized with the gasket seal at the interface between the window flange and the inner shell (and the trim ring, where equipped). The gasket seal prevents undesirable debris from being drawn directly into the window "bowl" area. Air intake is first directed into the circumferential cavity between the inner shell and outer shell through a relatively narrow gap between the horizontal flange on the inner shell and the inside surface of the outer shell. Once through the gap, the air stream then sees an increase in flow area and an accompanying decrease in velocity. Thus, the cavity 30a serves as a deceleration plenum where dirt and debris precipitate out of the incoming air stream. Air intake apertures 44 in the inner shell then allow the clean air stream to enter the area above the window. Thus the optical clarity of the window is ensured without the use of an air filter, wherein the use of an air filter would restrict air flow, require a larger exhaust blower, and further need periodic cleaning.

The air contained in cavity 30 between the inner shell and outer shell of the present invention also acts as an insulator, providing cooler operation in the summer and warmer operation in the winter. This is especially valuable for cases where both the inner and outer shell are comprised of a high conductivity metal, such as a hydroformed aluminum sheet, which is desirable in cases where line-voltage components such as a power supply transformer are located in the cavity 30 between the inner shell and outer shell for safety reasons.

Further in accordance with the present invention, one or more horizontal or angled plateaus are formed in the sides of the inner shell for mounting of components according to their intended function. Components (such as the power supply) to be concealed from a user are mounted on the upper outside surfaces of the plateaus to reside inside the cavity 30 between the inner shell 14 and outer shell 12. Components (such as terminal blocks or fuse holders) to be accessed by the user of the housing, particularly when the window is removed during installation or servicing, are mounted on the lower inside surfaces of the inner shell plateaus, i.e., within cavity 20.

In either case, the holes for mounting these components does not negatively impact the outside appearance of the outer shell, thus the outside appearance of the surveillance housing assembly. An additional advantage in manufacturing the inner shell is realized when all holes are punched through on plateau surfaces formed parallel to the lower flange of the inner shell. That is, all necessary holes can be advantageously punched through in one manufacturing step. In this configuration, relatively inexpensive standard punch tooling can be utilized instead of the more complex cam dies required for punching of holes in the formed side surfaces of known enclosure housings.

To contain acoustical noise generated by pan & tilt motors, vibration isolation and damping materials are inserted at interfaces between the inner shell 14 and outer shell 12 to interrupt the noise transmission path. For instance, the inner shell is formed with upper and lower compartment regions equipped with removable mounting means to support the less power-intensive camera and lens in the lower compartment near the window. More power-intensive ancillary devices, such as the pan & tilt motors, power supply, and control electronics, are positioned in the upper compartment. In one embodiment, the removable mounting means incorporate materials that damp vibration from the pan & tilt mechanism.

Still further, formation of the inner shell to conform close to interior equipment advantageously restricts a natural convection of warm air generated by heaters in the lower compartment from dissipating out of the upper exhaust blower opening during the winter. In the summer, forced convection by the exhaust fan still adequately communicates with the lower compartment, and especially cools the upper compartment where more power-intensive equipment is located. Thus, there is no need to resort to a costly and unreliable exhaust valve system such as proposed in U.S. Pat. No. 4,984,089. In yet another embodiment in accordance with the present invention, a sensor 114 for activating the exhaust fan is located in the upper compartment region.

In accordance with yet another aspect of the present invention, the exhaust blower 116 is located well away from the support pipe 110 and associated wire entry aperture 36. This advantageously simplifies wiring installation and imposes no air exhaust requirements on the wire conduit path above the housing. A separate cover 60 is provided over the exhaust fan opening 32 to form a torturous air exhaust path to further prevent rain from entering the housing from above.

The cover 60 can comprise a suitable material which would also function as a gasket for sealing the interface between the outer shell 12 and the supporting pipe flange 112. Cover 60 could also further provide a decorative transition to the support pipe 110, or serve to locate and/or retain such a decorative transition piece (e.g., transition cap 70). The radially outermost plateau surfaces 56 and 66 as discussed herein above, form a lap joint profile interrupted by a plurality of small ridges formed in the top edge of the outer shell, which advantageously provide for supporting and locating the decorative transition piece 70, while still allowing exhaust air to escape. A top of the decorative transition piece 70 contains an aperture appropriately sized to be slightly larger than the diameter of the support pipe 110, wherein the top of the decorative transition piece 70 may be caulked with an appropriate sealant to provide a further protection from the ingress of rain and snow.

In review, the exhaust blower in the top of the housing draws incoming air along the following path: 1. through circumferential opening(s) between the inner shell lower flange and outer shell, 2. through a deceleration plenum where dust and debris precipitate out, 3. up in the cavity 30 between inner shell and outer shell to apertures through the inner shell, 4. into the lower inner shell compartment region 42 where camera and lens are located over the window area, 5. through relatively narrow gaps between the inner shell contour and ancillary devices contained in the upper compartment region 40, 6. through the exhaust blower, and 7. out through the torturous path provided by the cover 60 and/or decorative transition piece 70.

In accordance with yet another aspect of the present invention, the heater and recirculating blower means 80 are mounted in the lower compartment of the inner shell with the camera, lens, and window. The blower recirculates air across the heater and directs it into the "bowl" of the hemispherical window to prevent external ice build-up on the window. The mechanical space to achieve this arrangement is provided by sizing the window diameter smaller than the housing diameter, as mentioned earlier. The heater and blower are located above the window flange out of range of the pan & tilt mechanism, but still near the edge of the window "bowl". In one embodiment, a sensor controlling the fan can be mounted in the lower compartment opposite the heater.

In accordance with yet another aspect of the present invention, a positive temperature coefficient (PTC) heater is utilized in the lower compartment. The internal resistance of this type of heater element drops with temperature, meaning it constantly automatically adjusts to supply only the amount of heat needed, and therefore does not rely on a separate temperature sensor (such as a thermostat) for control. In one embodiment, the heater power is supplied directly from incoming line wiring via a separate heater fuse. This configuration is inherently reliable and minimizes safety concerns.

Besides lower overall power consumption, the PTC heaters applied in this manner also help the condensation problem experienced during periods of transition from warmer, humid air to colder, dryer air. The PTC heaters are always energized and dynamically adjusted during this transition, helping to prevent the warm moist air from condensing inside the housing. There is no delay inherent in the use of thermostatically-controlled fixed-resistance heaters. In addition, the temperature drop triggers the sensor controlling the recirculating blower to clear any residual moisture that may remain on the inside surface of the window.

In accordance with yet another aspect of the present invention, the interlock switch 96 is mounted on the top of the inner shell lower flange. When the inner shell 14 is installed into the outer shell 12, connections to the interlock switch 96 are not directly accessible and therefore the switch cannot be readily defeated. A projecting post 98 on the window trim ring 92 extends through a corresponding hole in the inner shell lower flange 46 when the window assembly 90 is properly installed. Only in this later instance does the interlock switch close to energize a motion of the pan & tilt mechanism contained within cavity 20 of the inner shell.

The outdoor surveillance housing may likewise comprise a support means, a double-walled upper housing consisting of an inner shell that is affixed to the support means, and an outer shell attached to the inner shell and/or the support means. A horizontal flange on the inner shell is positioned near the and trimmed to fit inside the outer shell such that a cavity is formed between the two shells of the housing. Lastly, a transparent hemispherical window is removable affixed and/or sealed to the lower portion of the upper housing. The housing further includes a support means that is hollow, having openings in both inner and outer shells that communicate with the inside of the support means, and a seal at the interface between the support means and the housing and further surrounding the shell openings such that water cannot enter the housing through the interface.

The housing further can house components to be concealed from a user and components to be viewed from below by the user when the window is removed. One or more horizontal or angled plateaus formed in the sides of the inner shell permit the following mounting locations: a) components to be concealed from the user are mounted on the upper outside surfaces of the plateaus inside the cavity between the shells, and b) components to be viewed from below by the user when the window is removed are mounted on the lower inside surface of the plateaus.

The housing further provides a reasonably airtight flush joint or gasket for sealing the window to the inner shell flange. A gap or plurality of openings between the edge of the inner shell flange and the outer shell wall provides a path for outside air to enter the cavity between the two shells; and one or more air inlet apertures in the inner shell permit air flow from the cavity between the shells to the interior of the inner shell. An opening in the top of the housing allows air to exit the housing from a point separate from the hole connecting the hollow support means. Furthermore, an exhaust fan positioned proximate the exhaust opening forces air out of the interior of the housing.

A trim ring is attached to the window as an extension to the window flange. The trim ring may include tamper-proof screws inserted from below through holes in the trim ring which are held captive in the trim ring by retaining washers that are installed over the threaded portion of the screws protruding above. Corresponding threaded nuts are provided in the lower flange of the inner shell to facilitate tamper-proof attachment of the window to the housing.

An elastomeric gasket is fitted over part or all of the edge of the inner shell flange. The gasket is compressed against the outer shell at select points when both are assembled onto support means.

The exhaust fan is affixed to the inner shell and a reasonably airtight flush joint or gasket seals the fan outlet to the outer shell upon assembly of the inner shell subassembly into the outer shell.

The inner shell of the present invention advantageously conforms closely with respect to the ancillary devices enclosed in the upper compartment such that natural convection of air from the lower compartment through the upper compartment is further restricted without significantly restricting natural convection from the ancillary devices.

Other alternatives include two sensors in each of the upper and lower compartment to control the exhaust fan and the heater/heater fan, respectively, may be incorporated with the housing.

The mounting means 74 comprise a stationary support on one side and a rotatable support on the other side such that the ancillary device can be inserted into the upper compartment above the stationary support without much extra clearance, after which the rotatable support can be positioned under the other side of the ancillary device.

The support means 110 consists of a threaded support pipe screwed onto a pipe flange 112, wherein suitable screws through the flange thread into self-clinching blind fasteners (such as PEM type B) installed in the inner shell, with the outer shell and a gasket positioned between the flange and the inner shell such that the gasket seals around openings in both shells that match the opening in the pipe flange. The area of the interface between the support means and the housing is concealed by a decorative cap attached to or supported by either support means or housing.

The lower edge of the decorative cap forms a lap joint over the top edge of the housing, and the housing profile steps outward below the cap edge to maintain a generally flush joint appearance and support the lower edge of the cap. A plurality of small ridges are formed into the outer shell at the lap joint between the decorative cap and the housing such that the lower edge of the cap is held slightly up and away from the housing to create gaps or notches that allow exhaust fan outlet air and/or water to pass out from under the cap, yet not allow outside precipitation to enter. The upper edge of the decorative cap is sealed against the pipe to prevent ingress of water or dust. The housing assembly in accordance with the present invention can further permit the inner shell to be disassembled from the support means without removing the outer shell from the support means. Components accessed by an installer only upon initial installation are preferably located on an outside of the inner shell such that these components are hidden in the cavity 30 between inner and outer shells after the inner shell is secured within the outer shell to the support means. All openings through the inner or outer shells are effected on flat, horizontal or minimally angled surfaces such that the tools used to create these openings can easily access these surfaces. The color of the inner shell comprise a dark color such as black, and the color of the outer shell can comprise either a light color, such as white, to reflect the sun for an outdoor application, or a darker color, such as black, to blend in with the decor in an inside application. A flat top surface with at least one opening for communication with the support means, and a plurality of keyhole-shaped openings 103 can be provided to allow easy installation over screws that are partially tightened into the support means. A flange on the lower edge of the outer shell can further be provided, wherein the flange featuring openings through which fastening means can be inserted to attach the housing to a mounting surface 116 with the housing inserted up into a hole in the mounting surface.

While the invention has been particularly shown and described with reference to the preferred embodiment thereof, it will be understood by those skilled in the art that various changes in form and detail may be made therein without departing from the spirit and scope of the invention.

What is claimed is:

1. A surveillance housing assembly for use in housing surveillance equipment, said surveillance housing comprising:

an outer shell having a top wall portion and side wall portion, the side wall portion extending in a downward direction from the top wall portion thereby defining a first cavity;

an inner shell having a top wall portion for mounting engagement with an underside of the top wall portion of said outer shell within the first cavity, said inner shell further having a side wall portion, the side wall portion extending in a downward direction from the top wall portion thereby defining a second cavity, wherein the side wall portion of said inner shell further comprises a sequence of wall surfaces and plateau surfaces arranged for securing components of the surveillance equipment thereto in a prescribed manner such that first components of the surveillance equipment are disposed inbetween the underside of said outer shell and an outerside of said inner shell, and second components of the surveillance equipment are disposed within the second cavity; and a window assembly for mounting engagement with a bottom of the side wall portion of said inner shell.

2. The surveillance housing assembly of claim 1, wherein the top wall portion of said outer shell comprises an air exhaust aperture located therein, the top wall portion of said inner shell comprises an air exhaust aperture located therein and further to be coincident with the air exhaust aperture of the top wall portion of said outer shell, said inner shell further comprises an upper compartment and a lower compartment within the second cavity, wherein a set of plateau surfaces on the side wall portion of said inner shell separate the upper compartment from the lower compartment, the side wall portion further having at least one air inlet aperture for establishing an air flow path traversing into the first compartment, through the second compartment, and exiting via the air exhaust aperture of the top wall portion of said inner shell, said inner shell still further comprises a flange attached to the bottom of the side wall portion thereof, and wherein said window assembly is further attached to the flange.

3. The surveillance housing assembly of claim 2, further comprising a gasket disposed around a perimeter of the flange, wherein said gasket extends in a radial direction to be proximate to but not in contact with an inside of the side wall portion of said outer shell proximate to the bottom of the side wall portion of said outer shell.

4. The surveillance housing assembly of claim 3, further comprising means for extending said gasket in an outward radial direction for making said gasket contact the inside of the side wall portion of said outer shell at a number of points for stabilizing a bottom portion of said inner shell within said outer shell.

5. The surveillance housing assembly of claim 2, wherein the top wall portion of said outer shell comprises a plurality of plateau surfaces and wherein one of the plurality of plateau surfaces contains the air exhaust aperture of the top wall portion of said outer shell, said surveillance housing further comprising air outlet cover means for enabling a torturous air flow path proximate the air exhaust aperture of the top wall portion of said outer shell, said air outlet cover means for mounting engagement on a plateau surface above the plateau surface containing the air exhaust aperture of the top wall portion of said outer shell.

6. The surveillance housing assembly of claim 5, further wherein one of the plurality of plateau surfaces of the top wall portion of said outer shell further comprises a radially outermost plateau surface having an outer perimeter and an inner perimeter, wherein the inner perimeter comprises first sections having a first radial dimension and second sections having a second radial dimension, wherein the first radial dimension is greater than the second radial dimension, further wherein an additional plateau surface positioned above the radially outermost plateau surface forms a step of a given height;

said surveillance housing further comprising a decorative cap for mounting on top of the top wall portion of said outer shell, said decorative cap having a bottom edge portion thereof having a plurality of notches therein, and further wherein a lowermost portion of said decorative cap comprises an inner dimension for contacting with the step at the first sections, said decorative cap further having a lowermost exterior dimension for substantial alignment with the outer perimeter of the radially outermost plateau surface.

7. The surveillance housing assembly of claim 2, further comprising means for mounting selected components of the surveillance equipment to an underside of said inner shell, wherein the mounting means comprises a first mechanical mount and a second mechanical mount, the first mechanical mount being fixedly attached to a first one of the set of plateau surfaces on the side wall portion of said inner shell which separate the upper compartment from the lower compartment, the second mechanical mount being rotatably attached to the second of the set of plateau surfaces, opposite to the fast of the set of plateau surfaces, on the side wall portion of said inner shell which separate the upper compartment from the lower compartment, the second mechanical mount being rotatable between an out of the way position and a active support position.

8. The surveillance housing assembly of claim 2, further comprising a heater and recirculating blower means positioned substantially within the first compartment of said inner shell for recirculating air across a heater and directing heated air into said window assembly.

9. The surveillance housing assembly of claim 2, wherein said window assembly comprises a hemispherical window and a decorative trim ring attached to an outer perimeter of the hemispherical window.

10. The surveillance housing assembly of claim 9, further comprising an interlock switch mounted upon a top surface of the flange of said inner shell for disabling an electrical power to at least the portion of the surveillance equipment positioned within the underside of said inner shell when said window assembly is not yet attached to said inner shell and for enabling the electrical power when said window assembly is attached to said inner shell, further wherein said window assembly further comprises an interlock post attached to the trim ring of said window assembly for tactical engagement with the interlock switch through a corresponding aperture formed in the flange of said inner shell.

11. The surveillance housing assembly of claim 2, wherein said surveillance housing further comprises a pendant-mount type housing.

12. The surveillance housing assembly of claim 2, wherein said surveillance housing further comprises a below-the-ceiling-mount type housing.

13. The surveillance housing assembly of claim 2, wherein said surveillance housing further comprises a flush-ceiling-mount housing, wherein a retaining bracket is provided for securing said housing to a ceiling, and further wherein the trim ring of said window assembly extends in a radial direction beyond the outer perimeter of the lower most portion of said outer shell.

14. A surveillance housing assembly for use in housing surveillance equipment, said surveillance housing comprising:

an outer shell having a top wall portion and side wall portion, the side wall portion extending in a downward direction from the top wall portion thereby defining a first cavity;

an inner shell having a top wall portion for mounting engagement with an underside of the top wall portion of said outer shell within the first cavity, said inner shell further having a side wall portion, the side wall portion extending in a downward direction from the top wall portion to thereby define a second cavity, wherein the side wall portion of said inner shell comprises a sequence of wall surfaces and plateau surfaces arranged for a securing of the surveillance equipment thereto in a prescribed manner such that first components of the surveillance equipment are disposed inbetween the underside of said outer shell and an outside of said inner shell wherein the first components of the surveillance equipment are rendered directly inaccessible upon the securing of said inner shell within said outer shell, and second components of the surveillance equipment are disposed within the second cavity; and a window assembly for mounting engagement with a bottom of the side wall portion of said inner shell.

* * * * *